(12) United States Patent
Nakata

(10) Patent No.: US 9,743,012 B2
(45) Date of Patent: Aug. 22, 2017

(54) IMAGE PROCESSING APPARATUS, SYSTEM, METHOD, AND MEDIUM

(71) Applicant: CANON KABUSHIKI KAISHA, Tokyo (JP)

(72) Inventor: Takamichi Nakata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/433,692

(22) Filed: Feb. 15, 2017

(65) Prior Publication Data

US 2017/0163865 A1  Jun. 8, 2017

Related U.S. Application Data

(62) Division of application No. 14/747,813, filed on Jun. 23, 2015, now Pat. No. 9,609,199.

(30) Foreign Application Priority Data

Jun. 25, 2014  (JP) ................. 2014-130671

(51) Int. Cl.
*H04N 5/235* (2006.01)
*H04N 5/232* (2006.01)
*H04N 5/265* (2006.01)

(52) U.S. Cl.
CPC ......... *H04N 5/2356* (2013.01); *H04N 5/2353* (2013.01); *H04N 5/23206* (2013.01); *H04N 5/265* (2013.01)

(58) Field of Classification Search
CPC .. H04N 5/2355; H04N 5/232; H04N 5/23206; H04N 5/2353; H04N 5/23203; H04N 5/23222; H04N 5/23232; H04N 5/235; H04N 5/23245; H04N 5/2352; H04N 5/2621; H04N 5/265; H04N 5/35581; G06T 2207/10144; G06T 2207/20208; G06T 2207/20212
See application file for complete search history.

(56) References Cited

U.S. PATENT DOCUMENTS

| 7,369,160 | B2 | 5/2008 | Fujino et al. |
| 7,562,381 | B2 | 7/2009 | Koga |
| 7,852,374 | B2 | 12/2010 | Kaneko et al. |
| 8,482,651 | B2 | 7/2013 | Asukai et al. |

(Continued)

FOREIGN PATENT DOCUMENTS

JP  2008-236142 A  10/2008

*Primary Examiner* — Michael Osinski
(74) *Attorney, Agent, or Firm* — Canon USA, Inc., IP Division

(57) ABSTRACT

An image processing apparatus capable of communicating with an external apparatus via a network includes, a combining unit configured to combine a plurality of images captured under different exposure conditions, an exposure setting unit configured to acquire an image under a set exposure condition, a reception unit configured to receive a command for specifying an operation of the combining unit and the exposure setting unit from the external apparatus, and a first control unit configured to control a timing of the operation of the exposure setting unit, specified by the command received by the reception unit, based on an operation state of at least one of the combining unit and the exposure setting unit.

4 Claims, 9 Drawing Sheets

(56) References Cited

U.S. PATENT DOCUMENTS

| | | |
|---|---|---|
| 8,854,484 B2 | 10/2014 | Takagi |
| 9,426,392 B2 * | 8/2016 | Matsuzawa .............. H04N 5/77 |
| 9,451,173 B2 | 9/2016 | Kang et al. |
| 2002/0012065 A1 | 1/2002 | Watanabe |
| 2002/0191082 A1 | 12/2002 | Fujino et al. |
| 2003/0095192 A1 | 5/2003 | Horiuchi |
| 2003/0142745 A1 | 7/2003 | Osawa |
| 2005/0055727 A1 | 3/2005 | Creamer et al. |
| 2007/0046808 A1 | 3/2007 | Sagawa et al. |
| 2007/0103562 A1 | 5/2007 | Kaneko et al. |
| 2007/0211166 A1 | 9/2007 | Niikura |
| 2008/0231728 A1 | 9/2008 | Asoma |
| 2009/0086085 A1 | 4/2009 | Asoma |
| 2009/0263044 A1 | 10/2009 | Imagawa et al. |
| 2010/0066840 A1 | 3/2010 | Asukai et al. |
| 2010/0066858 A1 | 3/2010 | Asoma |
| 2010/0097493 A1 | 4/2010 | Asoma |
| 2010/0265340 A1 | 10/2010 | Masuda et al. |
| 2010/0328494 A1 * | 12/2010 | Kim ................... H04N 5/23216 348/231.99 |
| 2011/0128411 A1 * | 6/2011 | Masubuchi .......... H04N 5/2355 348/231.99 |
| 2011/0176028 A1 * | 7/2011 | Toyoda .............. H04N 5/35581 348/223.1 |
| 2011/0267481 A1 * | 11/2011 | Kagei ..................... G03B 3/10 348/211.9 |
| 2012/0002898 A1 | 1/2012 | Cote et al. |
| 2013/0021530 A1 * | 1/2013 | Takahashi .............. H04N 5/247 348/706 |
| 2013/0136364 A1 * | 5/2013 | Kobayashi .............. G06T 5/009 382/195 |
| 2014/0176776 A1 | 6/2014 | Morita |
| 2015/0002700 A1 | 1/2015 | Oshima |
| 2015/0181107 A1 | 6/2015 | Park et al. |
| 2015/0244916 A1 | 8/2015 | Kang et al. |
| 2015/0312463 A1 | 10/2015 | Gupta et al. |
| 2015/0319360 A1 * | 11/2015 | Sato ................... H04N 5/23216 348/207.11 |
| 2016/0125575 A1 | 5/2016 | Takahashi et al. |
| 2016/0156828 A1 | 6/2016 | Moon et al. |
| 2017/0085808 A1 * | 3/2017 | Jiang ................... H04N 5/2621 |

\* cited by examiner

FIG. 6A

```
<xs:complexType name="ImagingSettings20">
    <xs:sequence>
        <xs:element name="BacklightCompensation" type="tt:BacklightCompensation20" minOccurs="0"/>
        <xs:element name="Brightness" type="xs:float" minOccurs="0"/>
        <xs:element name="ColorSaturation" type="xs:float" minOccurs="0"/>
        <xs:element name="Contrast" type="xs:float" minOccurs="0"/>
        <xs:element name="Exposure" type="tt:Exposure20" minOccurs="0"/>
        <xs:element name="Focus" type="tt:FocusConfiguration20" minOccurs="0"/>
        <xs:element name="IrCutFilter" type="tt:IrCutFilterMode" minOccurs="0"/>
        <xs:element name="Sharpness" type="xs:float" minOccurs="0"/>
        <xs:element name="WideDynamicRange" type="tt:WideDynamicRange20" minOccurs="0"/>
        <xs:element name="WhiteBalance" type="tt:WhiteBalance20" minOccurs="0"/>
        <xs:element name="Extension" type="tt:ImagingSettingsExtension20" minOccurs="0"/>
    </xs:sequence>
    <xs:anyAttribute processContents="lax"/>
</xs:complexType>
```

FIG. 6B

```
<xs:complexType name="ImagingSettingsExtension20">
    <xs:sequence>
        <xs:any namespace="##other" processContents="lax" minOccurs="0" maxOccurs="unbounded"/>
        <xs:element name="ImageStabilization" type="tt:ImageStabilization" minOccurs="0"/>
        <xs:element name="Extension" type="tt:ImagingSettingsExtension202" minOccurs="0"/>
    </xs:sequence>
</xs:complexType>
```

FIG. 6C

```
<xs:complexType name="ImagingSettingsExtension202">
    <xs:sequence>
        <xs:element name="IrCutFilterAutoAdjustment" type="tt:IrCutFilterAutoAdjustment" minOccurs="0" maxOccurs="unbounded"/>
        <xs:element name="Extension" type="tt:ImagingSettingsExtension203" minOccurs="0"/>
    </xs:sequence>
</xs:complexType>
```

FIG. 6D

```
<xs:complexType name="ImagingSettingsExtension203">
    <xs:sequence>
        <xs:element name="DarknessCompensation" type="tt:DarknessCompensation" minOccurs="0" maxOccurs="unbounded"/>
        <xs:element name="Extension" type="tt:ImagingSettingsExtension204" minOccurs="0"/>
    </xs:sequence>
</xs:complexType>
```

FIG. 6E

```
<xs:complexType name="ImagingSettingsExtension204">
    <xs:sequence>
        <xs:any namespace="##targetNamespace" processContents="lax" minOccurs="0" maxOccurs="unbounded"/>
    </xs:sequence>
</xs:complexType>
```

FIG. 7A

```
<s:Body>
    .
    .
    .
            <SetImagingSettings xmlns="http://www.onvif.org/ver20/imaging/wsdl">
                <ImagingSettings xmlns="http://www.onvif.org/ver20/imaging/wsdl">
                    <WideDynamicRange xmlns="http://www.onvif.org/ver10/schema">
                        <Mode>
                        ON
                        </Mode>
                        <Level>
                        1.0
                        </Level>
                    <WideDynamicRange/>
                    <DarknessCompensation xmlns="http://www.onvif.org/ver10/schema">
                        <Mode>
                        OFF
                        </Mode>
                    <DarknessCompensation/>
                </ImagingSettings>
            </SetImagingSettings>
    .
    .
    .
</s:Body>
```

```
<s:Body>
    .
    .
    .
            <SetImagingSettings xmlns="http://www.onvif.org/ver20/imaging/wsdl">
                <ImagingSettings xmlns="http://www.onvif.org/ver20/imaging/wsdl">
                    <WideDynamicRange xmlns="http://www.onvif.org/ver10/schema">
                        <Mode>
                        ON
                        </Mode>
                        <Level>
                        1.0
                        </Level>
                    <WideDynamicRange/>
                    <DarknessCompensation xmlns="http://www.onvif.org/ver10/schema">
                        <Mode>
                        ON
                        </Mode>
                        <Level>
                        1.0
                        </Level>
                    <DarknessCompensation/>
                </ImagingSettings>
            </SetImagingSettings>
    .
    .
    .
</s:Body>
```

FIG. 7C

```
<s:Body>
    .
    .
    .
            <SetImagingSettings xmlns="http://www.onvif.org/ver20/imaging/wsdl">
                <ImagingSettings xmlns="http://www.onvif.org/ver20/imaging/wsdl">
                    <WideDynamicRange xmlns="http://www.onvif.org/ver10/schema">
                        <Mode>
                        ON
                        </Mode>
                        <Level>
                        1.0
                        </Level>
                    <WideDynamicRange/>
                    <DarknessCompensation xmlns="http://www.onvif.org/ver10/schema">
                        <Mode>
                        Auto
                        </Mode>
                        <Level>
                        1.0
                        </Level>
                    <DarknessCompensation/>
                </ImagingSettings>
            </SetImagingSettings>
    .
    .
    .
</s:Body>
```

FIG. 8A

```xml
<s:Body>
    .
    ,
        <SetImagingSettings xmlns="http://www.onvif.org/ver20/imaging/wsdl">
            <ImagingSettings xmlns="http://www.onvif.org/ver20/imaging/wsdl">
                <WideDynamicRange xmlns="http://www.onvif.org/ver10/schema">
                    <Mode>
                    OFF
                    </Mode>
                <WideDynamicRange/>
                <DarknessCompensation xmlns="http://www.onvif.org/ver10/schema">
                    <Mode>
                    OFF
                    </Mode>
                <DarknessCompensation/>
            </ImagingSettings>
        </SetImagingSettings>
    ,
    ,
</s:Body>
```

FIG. 8B

```xml
<s:Body>
    .
    ,
        <SetImagingSettings xmlns="http://www.onvif.org/ver20/imaging/wsdl">
            <ImagingSettings xmlns="http://www.onvif.org/ver20/imaging/wsdl">
                <WideDynamicRange xmlns="http://www.onvif.org/ver10/schema">
                    <Mode>
                    OFF
                    </Mode>
                <WideDynamicRange/>
                <DarknessCompensation xmlns="http://www.onvif.org/ver10/schema">
                    <Mode>
                    ON
                    </Mode>
                    <Level>
                    1.0
                    </Level>
                <DarknessCompensation/>
            </ImagingSettings>
        </SetImagingSettings>
    .
    ,
</s:Body>
```

FIG. 8C

```xml
<s:Body>
    .
    ,
        <SetImagingSettings xmlns="http://www.onvif.org/ver20/imaging/wsdl">
            <ImagingSettings xmlns="http://www.onvif.org/ver20/imaging/wsdl">
                <WideDynamicRange xmlns="http://www.onvif.org/ver10/schema">
                    <Mode>
                    OFF
                    </Mode>
                <WideDynamicRange/>
                <DarknessCompensation xmlns="http://www.onvif.org/ver10/schema">
                    <Mode>
                    Auto
                    </Mode>
                    <Level>
                    1.0
                    </Level>
                <DarknessCompensation/>
            </ImagingSettings>
        </SetImagingSettings>
    .
    ,
</s:Body>
```

ID:11534611:5/28/2025 10:22:07 AM

IMAGE PROCESSING APPARATUS, SYSTEM, METHOD, AND MEDIUM

CROSS-REFERENCE TO RELATED APPLICATIONS

This application is a Divisional of U.S. application Ser. No. 14/747,813, filed Jun. 23, 2015, which claims the benefit of priority from Japanese Patent Application No. 2014-130671 filed Jun. 25, 2014, each of which is hereby incorporated by reference herein in their entirety.

BACKGROUND OF THE INVENTION

Field of the Invention

The present disclosure generally relates to image processing, and more particularly relates to an image processing apparatus, system, method, and medium that combines pieces of image data obtained under different exposure conditions.

Description of the Related Art

A conventionally known image processing apparatus, such as an imaging apparatus, combines a long-exposure signal and a short-exposure signal to achieve an image with a wider dynamic range (Japanese Patent Application Laid-Open No. 2008-236142). For example, the following technique can be employed as another method with which an image with a wide dynamic range can be captured. Specifically, a processing condition such as a gain is changed for adjusting a dynamic range, whereby a subject involving a brightness difference, backlight in particular, is corrected.

On the other hand, a standard protocol has been known with which a common communication interface is established between the imaging apparatus and an external apparatus that communicates with the imaging apparatus via a network. A common standard established by Open Network Video Interface Forum (hereinafter, referred to as ONVIF as appropriate) has been known as an example of the standard protocol. In the protocol, ImagingSettings has been defined as a set of control commands related to various processing conditions about image quality and the like to control the imaging apparatus from the external apparatus.

SUMMARY OF THE INVENTION

However, with the technique of correcting the subject with the brightness difference described above, some images may have degraded image quality. Furthermore, when a combination of the correction with processing of achieving a wider dynamic range is performed, a problem occurs in which the resultant composite image is degraded due to a configuration and timing.

According to an aspect of the present disclosure, an image processing apparatus capable of communicating with an external apparatus via a network includes, a combining unit configured to combine a plurality of images captured under different exposure conditions, an exposure setting unit configured to acquire an image under a set exposure condition, a reception unit configured to receive a command for specifying an operation of the combining unit and the exposure setting unit from the external apparatus, and a first control unit configured to control a timing of the operation of the exposure setting unit, specified by the command received by the reception unit, based on an operation state of at least one of the combining unit and the exposure setting unit.

Further features of the present disclosure will become apparent from the following description of exemplary embodiments with reference to the attached drawings.

BRIEF DESCRIPTION OF THE DRAWINGS

FIGS. 6A to 6E are diagrams illustrating examples of definitions of an ImagingSettings type according to the first exemplary embodiment of the present disclosure.

FIGS. 7A to 7C are diagrams illustrating examples of command configurations in SetImagingSettings transactions according to the first exemplary embodiment of the present disclosure.

FIGS. 8A to 8C are diagrams illustrating examples of command configurations in SetImagingSettings transactions according to the first exemplary embodiment of the present disclosure.

DESCRIPTION OF THE EMBODIMENTS

Various exemplary embodiments, features, and aspects of the invention will be described in detail below with reference to the drawings.

The configuration described in the following exemplary embodiment is merely an example. The present disclosure is not limited to an illustrated configuration. Commands and coordinate systems in the following exemplary embodiment are determined based on the Open Network Video Interface Forum (ONVIF) standard, for example, but are not limited to these commands and coordinate systems.

Figure 1:
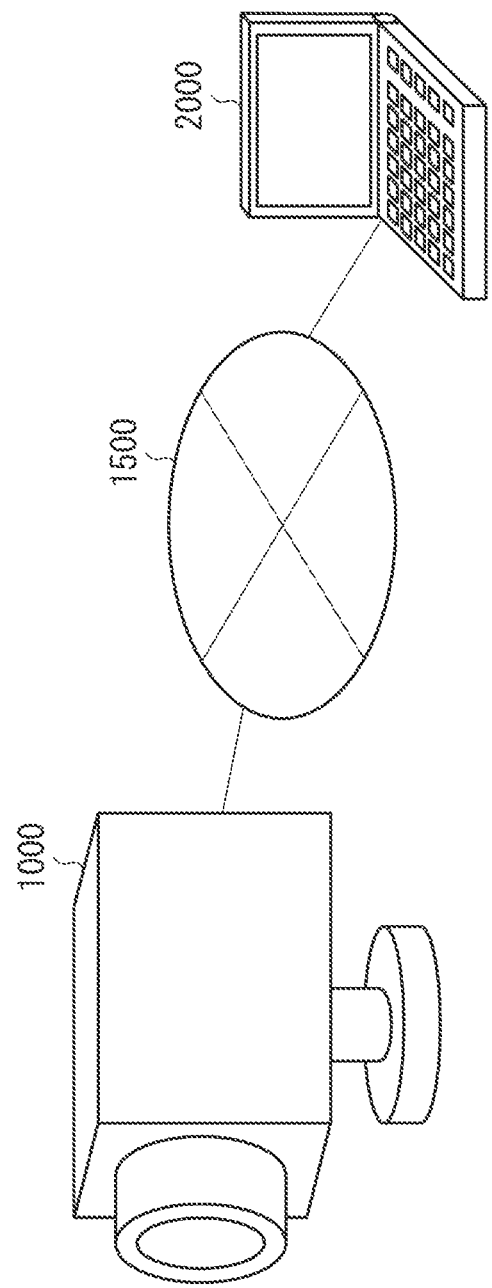
FIG. 1 is a diagram illustrating an example of a system configuration of a monitoring system according to a first exemplary embodiment of the present disclosure.

A network configuration according to a first exemplary embodiment is described with reference to FIG. 1. More specifically, FIG. 1 is a diagram illustrating an example of a system configuration of a monitoring system according to the present exemplary embodiment.

In the monitoring system according to the present exemplary embodiment, a monitoring camera 1000 that captures a video and a client apparatus 2000 are communicably connected to each other via an Internet Protocol (IP) network 1500 (through a network). Thus, the monitoring camera 1000 can distribute image data to the client apparatus 2000 through the IP network 1500.

The monitoring camera 1000 according to the present exemplary embodiment is an example of an imaging apparatus or an image processing apparatus. The client apparatus 2000 is an example of an external apparatus such as a personal computer (PC). The monitoring system according to the present exemplary embodiment corresponds to an imaging system or an image processing system.

For example, the IP network 1500 includes a plurality of routers, switches, cables, and the like compliant with a communication standard such as Ethernet (registered trademark). In the present exemplary embodiment, any communication standard, scale, and configuration may be employed as long as communications between the monitoring camera 1000 and the client apparatus 2000 can be performed.

For example, the IP network 1500 may be formed of the Internet, a wired local area network (LAN), a wireless LAN, a wide area network (WAN), or the like. For example, the monitoring camera 1000 according to the present exemplary embodiment may be compliant with Power Over Ethernet (PoE) (registered trademark), and may receive power supply through a LAN cable.

The client apparatus 2000 transmits various commands as control commands to the monitoring camera 1000. For example, the commands include a command for changing an imaging direction and an angle of view of the monitoring camera 1000, a command for changing an imaging parameter, and a command for starting image streaming.

On the other hand, the monitoring camera 1000 transmits a response (response command) and a streaming image to the client apparatus 2000, in response to the commands. The monitoring camera 1000 changes the angle of view in response to a command for changing the angle of view received from the client apparatus 2000. The monitoring camera 1000 changes a parameter used for imaging and a parameter used for image processing, in response to a command for changing the imaging parameter received from the client apparatus 2000.

Figure 2:
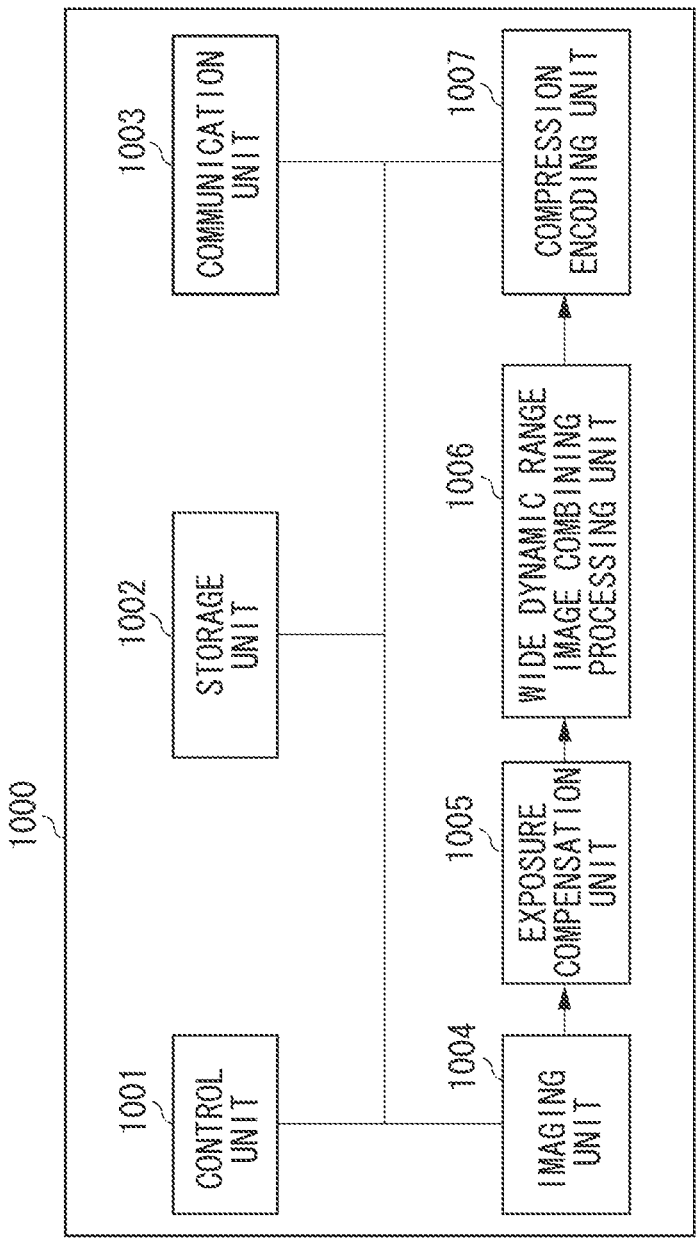
FIG. 2 is a block diagram illustrating an example of a hardware configuration of a monitoring camera according to the first exemplary embodiment of the present disclosure.

FIG. 2 is a block diagram illustrating an example of a hardware configuration of the monitoring camera 1000 according to the present exemplary embodiment.

A control unit 1001 illustrated in FIG. 2 performs overall control on components of the monitoring camera 1000. The control unit 1001 is formed of a central processing unit (CPU). The control unit 1001 executes a program stored in a storage unit 1002. Alternatively, the control unit 1001 may perform the control with hardware. As used herein, the term "unit" generally refers to any combination of software, firmware, hardware, or other component, such as circuitry, that is used to effectuate a purpose.

The storage unit 1002 is mainly used as a storage area for various data such as a storage area for the program executed by the control unit 1001, a work area during the execution of the program, and a storage area for image data generated by an imaging unit 1004 described below. The storage unit 1002 stores a parameter (image processing setting) used for various types of processing in blocks in the monitoring camera 1000, a parameter set by the client apparatus 2000, and the like.

A communication unit 1003 transmits and receives each control command to and from the client apparatus 2000. The communication unit 1003 performs appropriate packet processing on a communication content (data and the like), and the resultant content is temporarily stored in the storage unit 1002 or a buffer provided in the communication unit 1003 and the like. The imaging unit 1004 includes an imaging optical system, an imaging device such as a charged coupled device (CCD) sensor and a complementary metal-oxide-semiconductor (CMOS) sensor (not illustrated), and the like. The imaging unit 1004 generates an analog signal by capturing an image of a subject focused by the imaging optical system. The imaging unit 1004 converts the generated analog signal into digital data.

The imaging unit 1004 outputs the digital data obtained by the conversion, as the image data, to the storage unit 1002, an exposure compensation processing unit 1005, and a wide dynamic range image combining processing unit 1006.

The exposure compensation processing unit 1005 analyzes the image data output from the imaging unit 1004, and executes exposure correction processing partially or entirely on the image data, based on an exposure setting and an image processing setting stored in the storage unit 1002. The exposure compensation processing unit 1005 outputs the image data as a result of the exposure correction processing to the storage unit 1002.

The exposure correction processing includes color tone correction processing. The color tone correction processing is processing of generating image data having color tone or exposure corrected to be appropriate so that visibility of at least one of excessively-bright and excessively-dark areas is improved.

The exposure correction processing in the present exemplary embodiment includes backlight compensation processing and dark area compensation processing. The backlight compensation processing is processing in which the entire image data including a dark area in a backlight state (backlight condition) becomes brighter. The dark area compensation processing is processing in which a dark area (dark condition) in the image data is identified, and the identified dark area is corrected to be bright while maintaining the brightness of an image in a bright area.

The exposure correction processing in the present exemplary embodiment involves an exposure setting function of setting an exposure condition of the imaging unit 1004. The exposure condition includes an aperture value of the imaging optical system in the imaging unit 1004 as well as exposure time (accumulation time), an imaging gain, and the like of the imaging device in the imaging unit 1004.

The exposure compensation processing unit 1005 in the present exemplary embodiment corresponds to an exposure setting unit that sets the exposure condition of the imaging unit 1004 and acquires a single piece of image data generated by the imaging unit 1004 by capturing the image of the subject under the set exposure condition.

The wide dynamic range (hereinafter referred to as WDR as appropriate) image combining processing unit 1006 executes wide dynamic range processing (hereinafter referred to as WDR processing as appropriate).

The WDR image combining processing unit 1006 acquires images processed by the exposure compensation processing unit 1005 based on a plurality of images captured under different exposure conditions, output from the imaging unit 1004. The WDR image combining processing unit 1006 determines and combines portions with optimum brightness in the plurality of images after the processing. Thus, a single piece of composite image data with a wide dynamic range is generated. The WDR image combining processing unit 1006 outputs the generated composite image data to the storage unit 1002.

Thus, the WDR image combining processing unit 1006 according to the present exemplary embodiment corresponds to a combining unit that combines a plurality of pieces of image data, generated by the imaging unit 1004 by capturing images of the subject under different exposure conditions, to generate composite image data.

A compression encoding unit 1007 executes compression encoding processing on the image data output from the imaging unit 1004, the exposure compensation processing unit 1005, and the WDR image combining processing unit 1006, based on the compression encoding setting and a format such as Joint Photographic Experts Group (JPEG), H.264, or H.265. The compression encoding unit 1007 outputs the image data as a result of the compression encoding processing to the storage unit 1002.

When the client apparatus 2000 requests streaming distribution, the monitoring camera 1000 according to the present exemplary embodiment performs the streaming distribution of the image data, output from the compression encoding unit 1007, to the outside through the communication unit 1003 in response to the request.

In FIG. 2, the exposure compensation processing unit 1005 and the WDR image combining processing unit 1006 are connected in series. However, it is not limited thereto. The exposure compensation processing unit 1005 and the WDR image combining processing unit 1006 may be connected in parallel, or may be arranged in a reversed order.

In FIG. 2, the monitoring camera 1000 includes the imaging unit 1004. However, when an image stored in the storage unit 1002 is mainly used, the imaging unit 1004 does not necessarily need to be provided.

Figure 3:
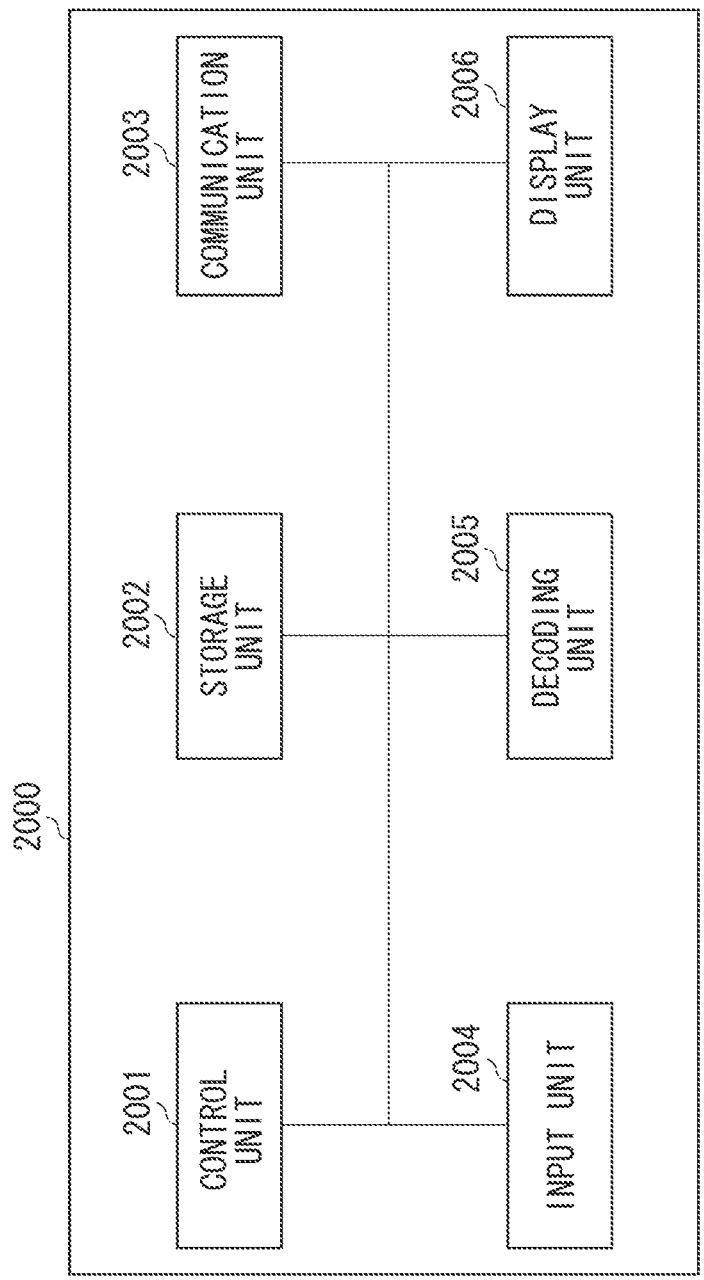
FIG. 3 is a block diagram illustrating an example of a hardware configuration of a client apparatus according to the first exemplary embodiment of the present disclosure.

FIG. 3 is a block diagram illustrating an example of a hardware configuration of the client apparatus 2000 according to the present exemplary embodiment. The client apparatus 2000 according to the present exemplary embodiment is a computer apparatus connected to the IP network 1500.

A control unit 2001 in FIG. 3 controls the entire client apparatus 2000. For example, the control unit 2001 includes a CPU, and executes a program stored in a storage unit 2002 described below. Alternatively, the control unit 2001 may perform the control with hardware. The storage unit 2002 is used as a storage area for the program executed by the control unit 2001, a work area during the execution of the program, and a data storage area.

A communication unit 2003 receives an instruction from the control unit 2001 and transmits a command and the like to the monitoring camera 1000. Furthermore, the communication unit 2003 receives a response with respect to the command and image data transmitted by the streaming distribution, and the like, from the monitoring camera 1000.

For example, an input unit 2004 includes a button, a cross key, a touch panel, a mouse, and the like. The input unit 2004 receives an instruction input from a user. For example, the input unit 2004 can receive an instruction to transmit various commands to the monitoring camera 1000, as an instruction from the user.

When the command transmission instruction to the monitoring camera 1000 is input from the user, the input unit 2004 notifies the control unit 2001 that the instruction has been input. The control unit 2001 generates a command to the monitoring camera 1000 in accordance with the instruction input to the input unit 2004. Then, the control unit 2001 instructs the communication unit 2003 to transmit the generated command to the monitoring camera 1000.

The input unit 2004 can receive a response to an inquiry message to the user, generated by the control unit 2001 by executing a program stored in the storage unit 2002, input by the user.

A decoding unit 2005 decodes and decompresses the image data output from the communication unit 2003. The decoding unit 2005 outputs the decoded and decompressed image data to a display unit 2006. Thus, the display unit 2006 displays an image corresponding to the image data output from the decoding unit 2005.

The display unit 2006 can display the inquiry message to the user, generated by the control unit 2001 executing a program stored in the storage unit 2002, for example.

The inner configuration of each of the monitoring camera 1000 and the client apparatus 2000 is described above. The processing blocks illustrated in FIG. 2 and FIG. 3 are for describing a preferred exemplary embodiment of the imaging apparatus and the external apparatus according to the present disclosure, and it is not limited thereto. Various modifications and changes can be made without departing from the gist of the present disclosure. For example a voice input unit or a voice output unit may be provided.

Figure 4:
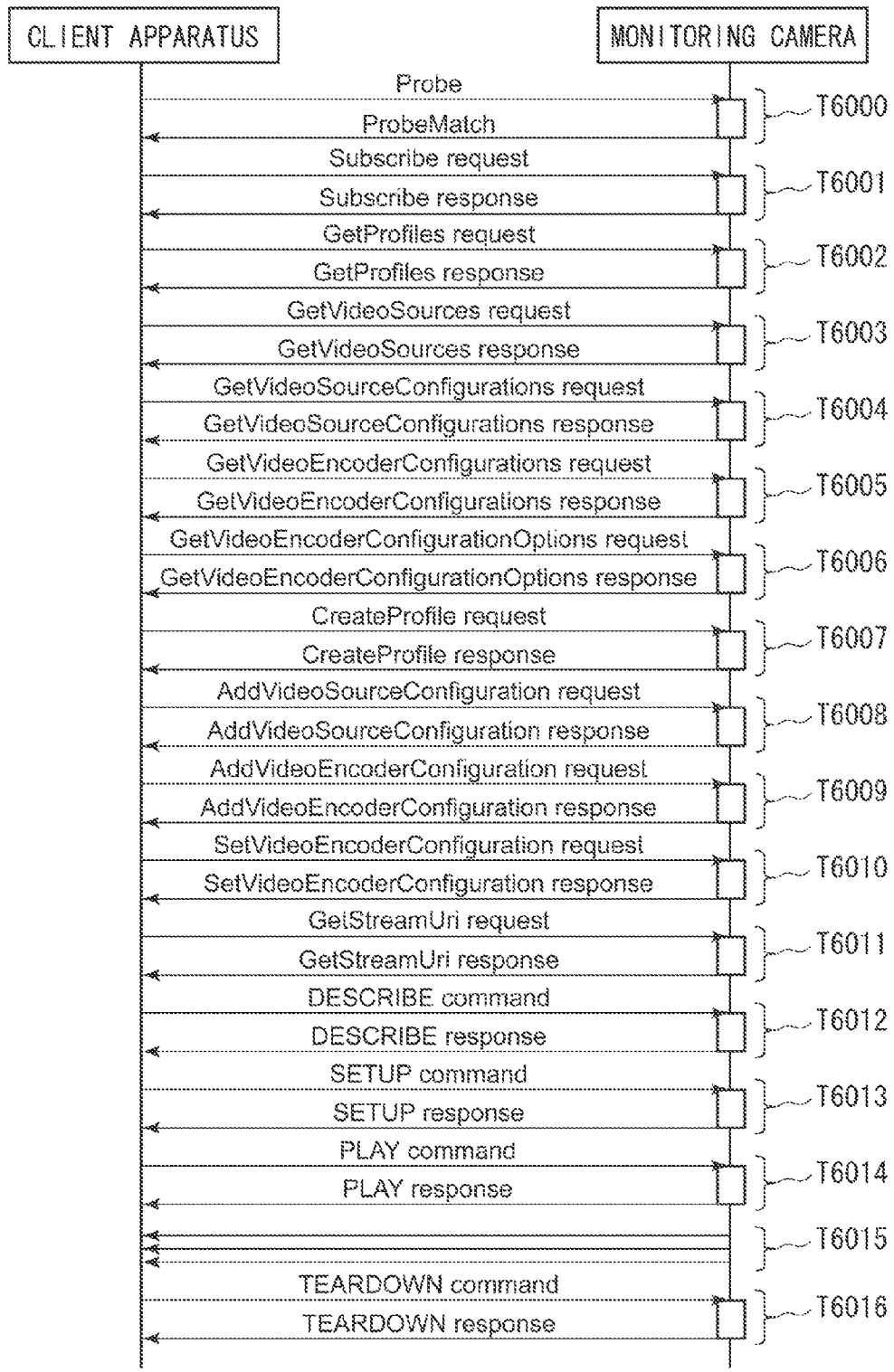
FIG. 4 is a sequence diagram illustrating a command sequence between the monitoring camera and the client apparatus according to the first exemplary embodiment of the present disclosure.

FIG. 4 illustrates a typical command sequence between the monitoring camera 1000 and the client apparatus 2000 during the time period from setting start to video distribution.

Each transaction in the present exemplary embodiment includes a pair of a command transmitted from the client apparatus 2000 to the monitoring camera 1000 and a response transmitted from the monitoring camera 1000 to the client apparatus 2000 in response to the command.

Various parameters referred to in the description of FIG. 4 are described below.

MediaProfile is a set of parameters for associating and storing various setting items of the monitoring camera 1000, and includes ProfileToken as an identification (ID) of MediaProfile, VideoSourceConfiguration, and VideoEncoderConfiguration, as well as links to various setting items including a voice encoder and the like.

VideoSource is a set of parameters indicating a performance of a single imaging unit 1004 of the monitoring camera 1000, and includes VideoSourceToken as an ID of VideoSource and Resolution indicating a resolution of image data that can be output by the imaging unit 1004.

VideoSourceConfiguration (hereinafter, referred to as VSC as appropriate) is a set of parameters for associating VideoSource of the monitoring camera with MediaProfile. VideoSourceConfiguration includes Bounds specifying an area of the image data, which is output based on VideoSource, to be segmented as a distributed image.

VideoEncoderConfiguration (hereinafter, referred to as VEC as appropriate) is a set of parameters for associating an encoder setting related to compression encoding for image data with MediaProfile. The monitoring camera 1000 performs compression encoding on image data output based on VideoSource and VSC in accordance with a parameter such as a compression encoding system (for example, JPEG or H.264), frame rate, or resolution set in the VEC. The resultant image data is distributed to the client apparatus 2000 through the communication unit 1003.

VideoEncoderConfiguration includes VideoEncoderConfigurationToken as an ID of VideoEncoderConfiguration and Encoding indicating the compression encoding method. VideoEncoderConfiguration further includes Resolution indicating the resolution of an output image, Quality indicating compression encoding quality, FramerateLimit indicating the maximum frame rate of the output image, and BitrateLimit indicating the maximum bit rate.

In transaction T6000 for network device connection, the client apparatus 2000 transmits a Probe command for establishing connection with a network device to the IP network 1500 through unicast or multicast. The monitoring camera 1000 connected to the IP network 1500 transmits a ProbeMatch response, indicating that the command can be received, to the client apparatus 2000.

In transaction T6001 for a Subscribe command, the client apparatus 2000 can instruct the monitoring camera 1000 to perform event distribution.

In transaction T6002 for a GetProfiles command, the client apparatus 2000 acquires a list of MediaProfile held by the monitoring camera 1000.

In transaction T6003 for a GetVideoSources command, the client apparatus 2000 acquires a list of VideoSource held by the monitoring camera 1000.

In transaction T6004 for a GetVideoSourceConfigurations command, the client apparatus 2000 acquires a list of VideoSourceCofiguration held by the monitoring camera 1000.

The client apparatus 2000 transmits the GetVideoSourceConfigurations command to the monitoring camera 1000. The monitoring camera 1000 that has received the GetVideoSourceConfigurations command transmits a list including an ID of the VSC held by the monitoring camera 1000 to the client apparatus 2000 as a response.

In transaction T6005 for a GetVideoEncoderConfigurationsm command, the client apparatus 2000 acquires the list of VEC held by the monitoring camera 1000.

The client apparatus 2000 transmits the GetVideoEncorderConfigurations command to the monitoring camera 1000. The monitoring camera 1000 that has received the command transmits a response with respect to the command.

In transaction T6006 for a GetVideoEncoderConfigurationOptions command, the client apparatus 2000 acquires options of each parameter and a range of the setting value that can be received by the monitoring camera 1000 in the VEC specified by the ID.

The client apparatus 2000 transmits the GetVideoEncorderConfigurationOptions command to the monitoring camera 1000. The monitoring camera 1000 that has received the command transmits a response with respect to the command. In this transaction, the client apparatus 2000 acquires a list including an ID of the compression encoding setting stored in the storage unit 1002 from the monitoring camera 1000.

In transaction T6007 for a CreateProfile command, the client apparatus 2000 creates new MediaProfile in the monitoring camera 1000 and acquires ProfileToken corresponding thereto. After this transaction, the monitoring camera 1000 transmits a MediaProfile change notification event for notifying the client apparatus 2000 on the network that a certain change has been made on MediaProfile.

In this transaction, the client apparatus 2000 can newly create a distribution profile in the monitoring camera 1000 and can acquire an ID of the created distribution profile. The monitoring camera 1000 stores the newly created distribution profile.

In transactions T6008 and T6009 for an AddVideoSourceConfiguration command and an AddVideoEncoderConfigurtion command, respectively, by specifying an ID, the client apparatus 2000 can associate the desired VSC and VEC with the specified MediaProfile. After these transactions, the monitoring camera 1000 transmits the MediaProfile change notification event for notifying the client apparatus 2000 on the network that a certain change has been made on MediaProfile.

In transaction T6010 for a SetVideoEncoderConfiguration command, the monitoring camera 1000 that has received the command transmits a response with respect to the command. In the transaction, the client apparatus 2000 sets the content of the VEC acquired in transaction T6005 based on the options acquired in transaction T6006. For example, the compression encoding system and the segmentation size are changed. The monitoring camera 1000 stores the content such as the compression encoding setting thus set.

With this command, the client apparatus 2000 sets the parameters of the VEC. After the transaction, the monitoring camera 1000 transmits a VEC change notification event for notifying the client apparatus 2000 on the network that a certain change has been made on the VEC.

In transaction T6011 for a GetStreamUri command, the client apparatus 2000 acquires an address (URI) with which the monitoring camera 1000 performs the streaming distribution based on the specified MediaProfile setting.

The monitoring camera 1000 transmits, to the client apparatus 2000 as a response, the address for performing the streaming distribution of an image corresponding to contents of the VSC and the VEC associated with the distribution profile ID specified by the client apparatus 2000.

In transaction T6012 for a DESCRIBE command, the client apparatus 2000 requests and acquires information on a content of the streaming distribution by the monitoring camera 1000, by executing the command using the URI acquired in transaction T6011.

In transaction T6013 for a SETUP command, the client apparatus 2000 executes the command by using the URI acquired in transaction T6011 so that a stream distribution method including a session number is shared between the client apparatus 2000 and the monitoring camera 1000.

In transaction T6014 for a PLAY command, the client apparatus 2000 requests the monitoring camera 1000 to start the streaming, by executing the command using the session number acquired in transaction T6013.

In transaction T6015 for stream distribution, the monitoring camera 1000 performs the streaming distribution, requested to be started in transaction T6014, using the distribution method shared in transaction T6013.

In transaction T6016 for a TEARDOWN command, the client apparatus 2000 requests the monitoring camera 1000 to stop the stream distribution by executing the command using the session number acquired in transaction T6013.

Figure 5:
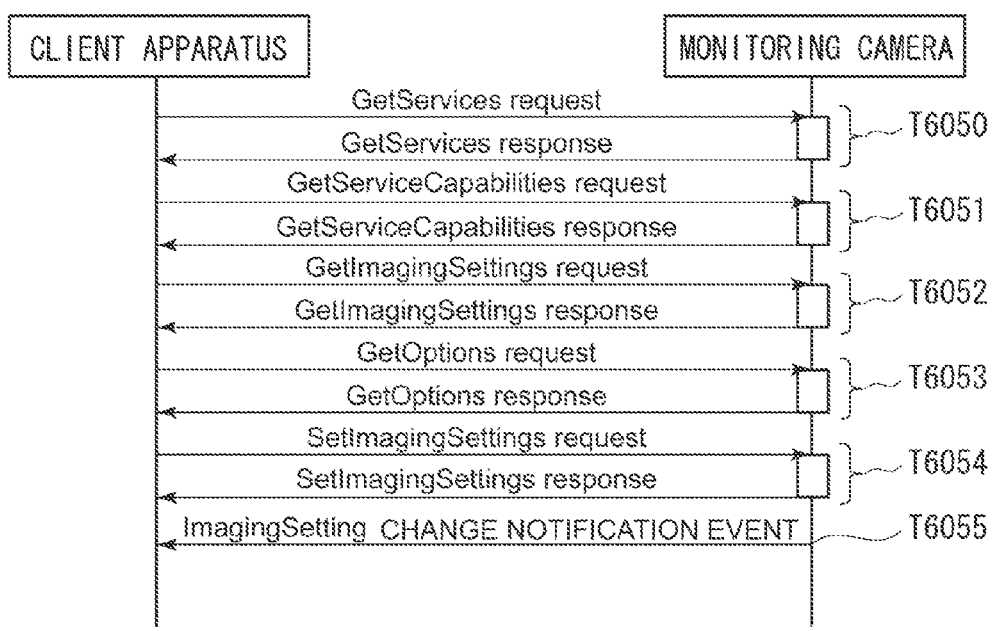
FIG. 5 is a sequence diagram illustrating a command sequence of the monitoring camera and the client apparatus according to the first exemplary embodiment of the present disclosure.

FIG. 5 illustrates a typical command sequence between the monitoring camera 1000 and the client apparatus 2000 for image processing setting ImagingSetting change.

In transaction T6050 for a GetServices command, the client apparatus 2000 acquires a type of a Web service supported by the monitoring camera 1000 and an address URI for utilizing each Web service.

The client apparatus 2000 transmits the GetServices command to the monitoring camera 1000. The monitoring camera 1000 that has received the command transmits a response with respect to the command.

In transaction T6051 for a GetServiceCapabilities command, the client apparatus 2000 acquires a list of functions of each Web service acquired in transaction T6050.

The client apparatus 2000 transmits the GetServiceCapabilities command to the monitoring camera 1000. The monitoring camera 1000 that has received the command transmits a response with respect to the command.

In transaction T6052 for a GetImagingSettings command, the client apparatus 2000 acquires a list of image processing setting ImagingSetting held by the monitoring camera 1000.

The client apparatus 2000 transmits the GetImagingSettings command to the monitoring camera 1000. The monitoring camera 1000 that has received the command transmits a response with respect to the command.

In transaction T6053 for a GetOptions command, the client apparatus 2000 acquires options of a parameter of the image processing setting ImagingSettings that can be received by the monitoring camera 1000.

The client apparatus 2000 transmits the GetOptions command to the monitoring camera 1000. The monitoring camera 1000 that has received the command transmits a response with respect to the command.

In transaction T6054 for a SetImagingSettings command, the client apparatus 2000 transmits a new image processing setting ImagingSetting to the monitoring camera 1000 to change the image processing setting.

In transaction T6055 for an ImagingSetting change notification event after transaction T6054, the monitoring camera 1000 transmits the ImagingSetting change notification event for notifying the client apparatus 2000 on the network that a certain change has been made on ImagingSetting.

FIGS. 6A to 6E illustrate examples of definitions of an ImagingSettings type according to the present exemplary embodiment. In the present exemplary embodiment, an XML Schema Definition language (hereinafter, referred to as XSD as appropriate), used in the ONVIF standard, is used for defining the ImagingSetttings type.

FIGS. 6A to 6E illustrate contents of the ImagingSettings type. Elements in FIG. 6A are specified to appear in the defined sequence by the sequence specifier.

In FIG. 6A, BacklightCompensation (hereinafter, referred to as BLC as appropriate) is a parameter for turning ON and OFF the backlight compensation. The BLC may be omitted with a minOccurs specifier in XSD.

Brightness is a parameter for specifying the brightness of an image captured by the imaging unit 1004. The Brightness may be omitted by using the minOccurs specifier in XSD. ColorSaturation is a parameter for indicating a color saturation of an image captured by the imaging unit 1004. The ColorSaturation may be omitted by the minOccurs specifier in XSD.

Contrast is a parameter for specifying a color density of the image captured by the imaging unit 1004. This Contrast may be omitted by using the minOccurs specifier in XSD. Exposure is a parameter for changing exposure of the image captured by the imaging unit 1004. This Exposure may be omitted by using the minOccurs specifier in XSD.

Focus is a parameter for changing focus setting of the imaging unit 1004. This Focus may be omitted by using the minOccurs specifier in XSD. IrCutFilter is a parameter for changing a setting of an infrared cut filter (IRCF) that can be inserted to and removed from an optical path of the imaging optical system in the imaging unit 1004.

The IRCF is a filter for blocking infrared light. This IRCutFilter may be omitted by using the minOccurs specifier in XSD.

Sharpness is a parameter for changing a setting of sharpness of the image captured by the imaging unit 1004. This Sharpness may be omitted by using the minOccurs specifier in XSD.

WideDynamicRange is a parameter for changing a setting of WDR processing executed by the WDR image combining processing unit 1006. ON and OFF can be set as a value of the WideDynamicRange. This WideDynamicRange may be omitted by using the minOccurs specifier in XSD.

WideDynamicRange with the value set to be ON indicates that the WDR processing in the monitoring camera 1000 is ON. WideDynamicRange with the value OFF indicates that the WDR processing in the monitoring camera 1000 is OFF. Thus, the SetImagingSettings command in the present exemplary embodiment corresponds to a combining command for controlling the operation of the WDR image combining processing unit 1006.

WhiteBalance is a parameter for adjusting white balance of the image captured by the imaging unit 1004. WhiteBalance may be omitted by using the minOccurs specifier in XSD. Extention includes an extended parameter as in FIG. 6B and the like. This Extention may be omitted by using the minOccurs specifier in XSD.

FIGS. 6B to 6E illustrate parameters added to ImagingSettings illustrated in FIG. 6A. The parameters are part of the image processing setting as in the case of the parameters in FIG. 6A.

ImageStabilization in FIG. 6B is a parameter for setting an image stabilization function for the image captured by the imaging unit 1004. Elements in FIG. 6B are specified by the sequence specifier to appear in the defined sequence.

IrCutFilterAutoAdjustment in FIG. 6C is a parameter for setting information (luminance of the subject and delay time) used when the IRCF is inserted and removed. Elements in FIG. 6C are specified by the sequence specifier to appear in the defined sequence.

ImageStabilization and IrCutFilterAutoAdjustment may be omitted by using the minOccurs specifier in XSD.

DarknessCompensation in FIG. 6D is a parameter for setting the dark area compensation function of the exposure compensation processing unit 1005. The dark area compensation function is for detecting dark and bright areas in the image captured by the imaging unit 1004 and compensating only the dark area to be bright. Elements in FIG. 6D are specified by the sequence specifier to appear in the defined sequence.

DarknessCompensation is hereinafter referred to as DC as appropriate. DarknessCompensation may be omitted by using the minOccurs specifier in XSD.

At least any of ON, OFF, and AUTO can be set as a value of the DC (operation specification). The DC with the value set to be ON indicates that the dark area compensation function in the monitoring camera 1000 is ON. The DC with the value set to be OFF indicates that the dark area compensation function in the monitoring camera 1000 is OFF. The DC with the value set to AUTO indicates that the monitoring camera 1000 automatically determines whether the dark area compensation function is to be ON or OFF (operation specification).

Thus, the SetImagingSettings command in the present exemplary embodiment corresponds to an exposure setting command for specifying (controlling) the operation of the exposure compensation processing unit 1005.

Thus, in transaction T6053 for the GetOptions command in the present exemplary embodiment, the options described above relating to WDR, BC, and DC are transmitted as settable parameters to the client apparatus 2000 as a response.

The WDR with the value set to be ON in transaction T6054 for the SetImagingSettings command in FIG. 5 can be additionally provided with a Level parameter for specifying an effective level. However, the description of Level is omitted herein. Similarly, the DC with the value set to be ON in this transaction can be additionally provided with a Level parameter for specifying an effective level. However, the description of Level is omitted herein.

FIGS. 7A to 7C illustrate configuration examples of the SetImagingSettings command in transaction T6054 in FIG. 5. FIG. 7A illustrates a configuration of the SetImagingSettings command for notifying the WDR setting parameter 7002 of WDR and the DC setting parameter 7003 described above from the client apparatus 2000 to the monitoring camera 1000. The setting parameters represent a case where WDR is ON, Level indicating the effective level of WDR is 1.0, and DC is OFF. Thus, a plurality of image processing parameters may be simultaneously set in the monitoring camera 1000 by the SetImagingSettings command from the client apparatus 2000. These settings are not dependent on the state of the monitoring camera 1000, and thus the monitoring camera 1000 cannot recognize what parameters are set and when they are set.

FIG. 7B illustrates a case where WDR is ON, Level indicating the level of WDR is 1.0, DC is ON, and Level indicating the level of DC is 1.0. FIG. 7C illustrates a case where WDR is ON, Level indicating the level of WDR is 1.0, DC is AUTO, and Level indicating the level in AUTO is 1.0.

On the other hand, FIGS. 8A to 8C illustrate the SetImagingSettings command when the setting parameter of the WDR is OFF. More specifically, FIG. 8A illustrates a case where the WDR is OFF and DC is OFF. FIG. 8B illustrates a case where the WDR is OFF, DC is ON, and Level indicating the level of DC is 1.0. FIG. 8C illustrates a case where WDR is OFF, DC is AUTO, and Level indicating level in AUTO is 1.0. Here, Levels are all 1.0. However, this is merely an example, and a Level may take a different value.

Figure 9:
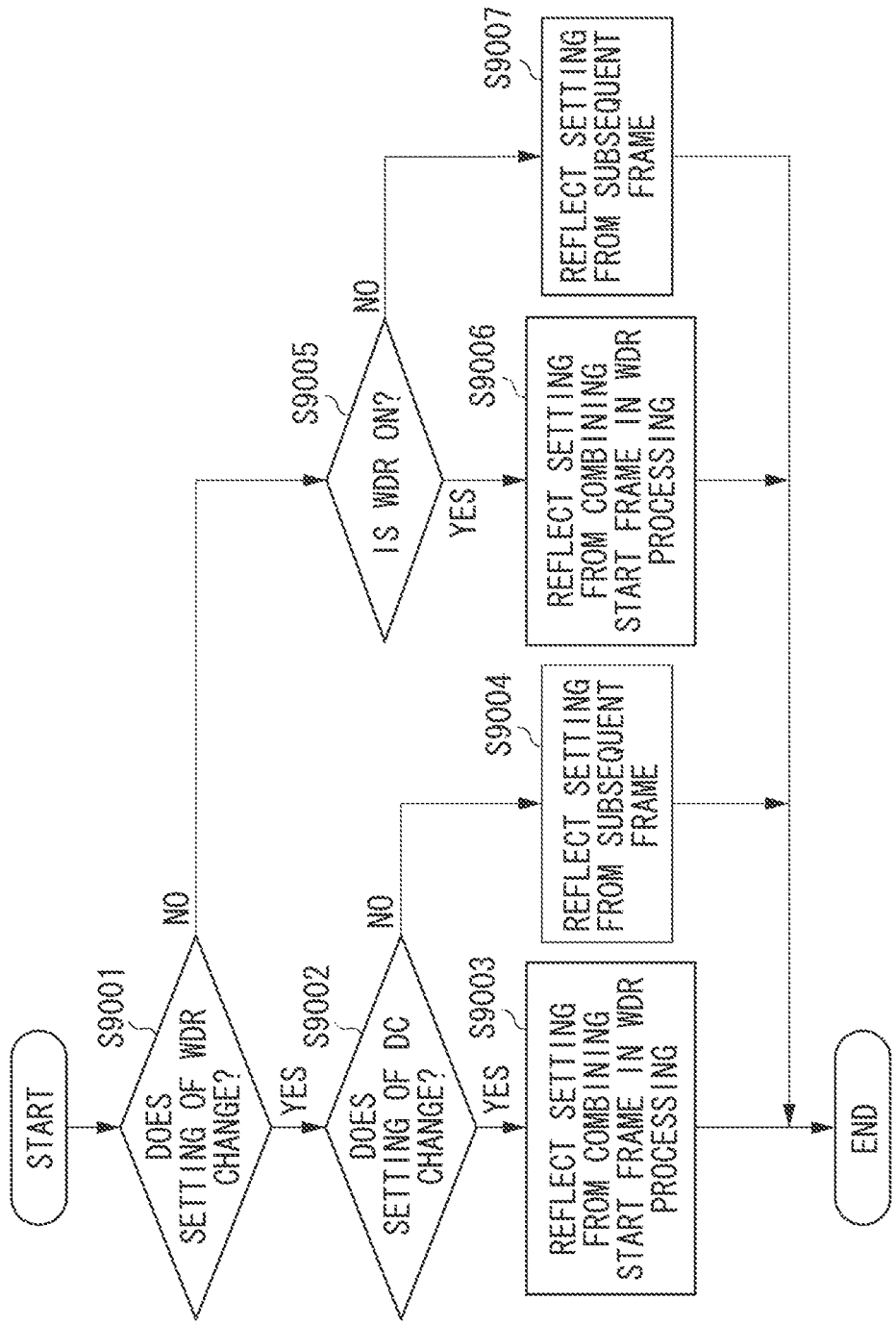
FIG. 9 is a flowchart illustrating wide dynamic range (WDR) and dark area compensation (DC) operations via an ImagingSettings command according to the first exemplary embodiment of the present disclosure.

FIG. 9 is a flowchart illustrating operations performed when the monitoring camera 1000 receives from the client apparatus 2000 a SetImagingSettings command illustrated in FIGS. 7A to 7C or FIGS. 8A to 8C. The control unit 1001 starts the processing in this flowchart upon receiving the SetImagingSettings command transmitted from the client apparatus 2000 and the like through the communication unit 1003.

In step S9001, the control unit 1001 analyzes a description content of the received SetImagingSettings command, and compares the description content with the current operation content to determine whether the setting of WDR is changed by the received command. When the setting changes (YES in step S9001), the processing proceeds to step S9002. On the other hand, when the setting does not change (NO in step S9001), the processing proceeds to step S9005.

In step S9002, the control unit 1001 analyzes the description content of the received SetImagingSettings command and compares the description content with the current operation content to determine whether the setting of DC is changed by the received command. When the setting changes (YES in step S9002), the processing proceeds to step S9003. On the other hand, when the setting does not change (NO in step S9002), the processing proceeds to step S9004.

In step S9003, the control unit 1001 causes reflection of the setting (operation timing) specified by the received SetImagingSettings command to be delayed to a time point at which a combining start frame in the WDR processing is captured. More specifically, when a plurality of images captured under different exposure conditions is acquired to be combined for the WDR processing, an operation of changing a setting of correction processing and the like collectively on all the plurality of images is performed as a unit. Thus, the DC is turned ON for the images used in the WDR processing, whereby the resultant composite image is less likely to be abnormal so that processing can be prevented from being inconsistent. One example of the inconsistent processing is a case where three images combined in the WDR processing include two images captured with DC turned ON and a remaining image captured with DC turned OFF. After reflecting the setting, the control unit 1001 transmits a response to the client apparatus 2000, and the processing is terminated.

In step S9004, the control unit 1001 reflects the setting specified by the received SetImagingSettings command from a subsequent frame. Thus, the setting is immediately reflected, so that the WDR processing starts from the subsequent frame. Here, the setting of WDR is changed but the setting of DC is not changed, whereby processing is prevented from being inconsistent, and the resultant composite image is less likely to be abnormal. After reflecting the setting, the control unit 1001 transmits a response to the client apparatus 2000, and the processing is terminated.

On the other hand, in step S9005, the control unit 1001 determines the current WDR operation state. More specifically, whether the WDR processing is being executed is determined. When the processing is being executed (YES in step S9005), the processing proceeds to step S9006. On the other hand, when the processing is not being executed (NO in step S9005), the processing proceeds to step S9007.

In step S9006, the control unit 1001 causes the setting specified by the received SetImagingSettings command to be delayed to a time point at which a combining start frame in the WDR processing is captured. More specifically, when a plurality of images captured under different exposure conditions is acquired to be combined for the WDR processing, an operation of changing a setting of correction processing and the like collectively on all the plurality of images is performed as a unit. Thus, the processing can be prevented from being inconsistent. After reflecting the setting, the control unit 1001 transmits a response to the client apparatus 2000, and the processing is terminated.

In step S9007, the control unit 1001 reflects the setting specified by the received SetImagingSettings command from a subsequent frame. Thus, the setting is immediately reflected, so that the WDR processing starts from the subsequent frame. Here, the setting of WDR is changed but the setting of DC is not changed, whereby processing is prevented from being inconsistent, and the resultant composite image is less likely to be abnormal. After reflecting the setting, the control unit 1001 transmits a response to the client apparatus 2000, and the processing is terminated.

As described above, the monitoring camera 1000 in the present exemplary embodiment checks the latest states of WDR and DC, and executes appropriate processing. Thus, the quality of the WDR composite image can be prevented from degrading. More specifically, with the operation of the monitoring camera 1000 according to the present exemplary embodiment, the image quality can be prevented from being abnormal even when interfering correction processing setting is set while the processing, such as the WDR processing, collectively performed on a plurality of images is being executed.

The transmission of WDR and DC setting values and the setting of Levels for the DC and WDR, performed in the present exemplary embodiment, can each be omitted.

The case where the WDR processing and the DC processing are combined is exemplified in the present exemplary embodiment. Alternatively, color-gradation correction processing, backlight compensation processing, dark area compensation processing, and the like may replace the processing or may be further combined.

In step S9003 and the like in FIG. 9, the operation of causing the reflection of the setting to be delayed to the combining start frame of the WDR is exemplified. However, it is not limited thereto. For example, instead of causing the reflection of the setting to be delayed, the abnormal image may be discarded so as not to be transmitted to the client apparatus 2000. More specifically, the delayed amount is controlled in such a manner that the image transmission operation is delayed to the next WDR combining start frame. This operation can prevent the adverse effect of the abnormal image. An operation of copying a previous frame may be performed for delaying the image transmission operation. Furthermore, only the abnormal image may be discarded and the WDR processing may be executed with the smaller number of images.

In step S9003 and the like in FIG. 9, the operation of causing the reflection of the setting to be delayed to the combining start frame of the WDR is exemplified. However, it is not limited thereto. For example, even when the DC setting changes, the delaying may not be required when the value of DC is set to AUTO before and after the change. More specifically, when the value of DC is set to AUTO, the monitoring camera 1000 automatically determines whether to turn ON or OFF the dark area compensation function. Thus, the operation might be consistent even when the setting value changes. Thus, whether to cause the reflection of the setting to be delayed to the combining start frame of the WDR may be determined further based on the result of determination with AUTO (specification result).

The response is transmitted when the processing is terminated (after the setting is reflected) in FIG. 9. Alternatively, the timing at which the response is transmitted (transmission timing) may be before the setting is reflected, or may be delayed by a predetermined time period.

The present disclosure may be implemented by executing the following processing. More specifically, software (program) for implementing the functions in the exemplary embodiment described above is provided to a system or an apparatus through a network or a various computer-readable storage medium. Then, a computer (or a CPU, microprocessing unit (MPU), or the like) of the system or the apparatus reads out and executes the computer program.

The exemplary embodiments of the present disclosure have been described above. However, the present disclosure is not limited to the exemplary embodiments, and can be modified and changed in various ways without departing from the spirit of the present disclosure.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, microprocessing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus communicating with an external apparatus via a network, the image processing apparatus comprising:
   a combining unit configured to combine a plurality of images captured under different exposure conditions;
   an exposure setting unit configured to acquire an image under a set exposure condition;
   a reception unit configured to receive a command for specifying an operation of the combining unit and the exposure setting unit from the external apparatus;
   a transmission unit configured to transmit a composite image obtained by the combining unit to the network;
   a delaying unit configured to cause a transmission operation of the transmission unit to be delayed; and
   a control unit configured to control a delay amount by the delaying unit based on an operation state of at least one of the combining unit and the exposure setting unit.

2. An image processing system comprising an image processing apparatus communicating with an external apparatus via a network,
   the image processing apparatus comprising:
   a combining unit configured to combine a plurality of images captured under different exposure conditions;
   an exposure setting unit configured to acquire an image under a set exposure condition; and
   a control unit configured to control an operation of the exposure setting unit, and
   the external apparatus comprising a transmission unit configured to transmit a command for specifying an operation of the combining unit and the exposure setting unit from the external apparatus,
   wherein the control unit controls a timing of the operation of the exposure setting unit, specified by the command transmitted by the transmission unit, based on an operation state of at least one of the combining unit and the exposure setting unit.

3. A method for controlling an image processing system including an image processing apparatus communicating with an external apparatus via a network and including a combining unit configured to combine a plurality of images captured under different exposure conditions and an exposure setting unit configured to acquire an image under a set exposure condition, the method comprising:
   controlling an operation of the exposure setting unit in the image processing apparatus; and
   transmitting a command for specifying an operation of the combining unit and the exposure setting unit from the external apparatus,
   wherein a timing of the operation of the exposure setting unit, specified by the transmitted command, is controlled based on an operation state of at least one of the combining unit and the exposure setting unit.

4. A non-transitory computer-readable storage medium storing a computer program for causing a computer to execute a method for controlling an image processing system including an image processing apparatus communicating with an external apparatus via a network and including a combining unit configured to combine a plurality of images captured under different exposure conditions and an exposure setting unit configured to acquire an image under a set exposure condition, the method comprising:
   controlling an operation of the exposure setting unit in the image processing apparatus; and transmitting a command for specifying an operation of the combining unit and the exposure setting unit from the external apparatus, wherein a timing of the operation of the exposure setting unit, specified by the transmitted command, is controlled based on an operation state of at least one of the combining unit and the exposure setting unit.

* * * * *